United States Patent
Wright

(12) 
(10) Patent No.: US 6,515,683 B1
(45) Date of Patent: Feb. 4, 2003

(54) AUTOCONFIGURING GRAPHIC INTERFACE FOR CONTROLLERS HAVING DYNAMIC DATABASE STRUCTURES

(75) Inventor: William T. Wright, Maple Glen, PA (US)

(73) Assignee: Siemens Energy and Automation, Alpharetta, GA (US)

( * ) Notice: Subject to any disclaimer, the term of this patent is extended or adjusted under 35 U.S.C. 154(b) by 441 days.

(21) Appl. No.: 09/598,378

(22) Filed: Jun. 21, 2000

Related U.S. Application Data

(60) Provisional application No. 60/140,236, filed on Jun. 22, 1999.

(51) Int. Cl.[7] .................................................. G09G 5/00
(52) U.S. Cl. ......................................... 345/772; 345/744
(58) Field of Search ................................ 345/771, 772, 345/773, 826, 762–763, 744–747, 817, 859–862, 748, 717, 706, 741–743; 709/230; 707/10, 530, 532; 700/83

(56) References Cited

U.S. PATENT DOCUMENTS

| | | | | |
|---|---|---|---|---|
| 5,361,336 A | * | 11/1994 | Atchison | 345/771 |
| 5,410,535 A | * | 4/1995 | Yang et al. | 370/13 |
| 5,444,642 A | * | 8/1995 | Montgomery et al. | 717/1 |
| 5,553,245 A | * | 9/1996 | Su et al. | 345/744 |
| 5,619,709 A | * | 4/1997 | Caid et al. | 707/532 |
| 5,805,442 A | | 9/1998 | Crater et al. | 364/138 |
| 5,812,394 A | * | 9/1998 | Lewis et al. | 345/771 |
| 5,852,722 A | * | 12/1998 | Hamilton | 709/230 |
| 5,980,078 A | * | 11/1999 | Krivoshein et al. | 700/2 |
| 6,023,698 A | * | 2/2000 | Lavoy, Jr. et al. | 707/10 |
| 6,061,603 A | | 5/2000 | Papadopoulos et al. | 700/83 |
| 6,369,838 B1 | * | 4/2002 | Wallace et al. | 345/810 |
| 6,417,870 B1 | * | 7/2002 | Brackett et al. | 345/771 |
| 6,434,572 B2 | * | 8/2002 | Denzay et al. | 707/104.1 |

OTHER PUBLICATIONS

Technican International Congress, *Advances in Automated Analysis* Mediad, Tarrytown, N.Y., Ch. 8, 1973.*
Shneiderman, *Designing the User Interface: Strategies for Effective Human—Computer Interaction*, Addison Wesley Longman, Reading, MA. Ch. 10, 1998.*
National Instruments Corp., *Labview*, National Instruments Press, Austin, Texas, Ch. 4, 1991.*

* cited by examiner

*Primary Examiner*—Steven Sax

(57) ABSTRACT

A controller is provided which allows an interface device to autoconfigure a graphic interface to reflect the configuration of the controller. The controller has a static memory and a dynamic memory. The static memory contains predefined memory elements which contain information on the number of control loops being controlled, the type of each control loop, and the location within the dynamic memory of a data grouping associated with each control loop. An interface device accesses the static memory to obtain the information necessary to display a graphic interface representative of the controller configuration, and to access appropriate data groups within the dynamic memory to update the graphic interface to reflect the status of the process.

17 Claims, 6 Drawing Sheets

| CIP | 1 | 2 | 3 | 4 | 5 | 6 | 7 | 8 | 9 | 10 | 11 | 12 |
|---|---|---|---|---|---|---|---|---|---|---|---|---|
| 1 | PI | PGI | TI | TDI | DGI | MRI | RI | BI | PF | | HDF | |
| 2 | SI | TSPI | RT1 | HLI | LLI | HRI | CAI | | SF | | LDF | |
| 3 | VI | T2mI | TEI | T1mI | THI | T2mI | T2II | | VF | | DBF | |
| 4 | CLS | TAG | | | | | | PUR | | RHI | RLI | GPPI |
| 5 | ASW | A1LI | A2LI | A3LI | A4LI | A1TW | A2TW | A3TW | A4TW | ECLS | | |

Figure 3

| CIP | 1 | 2 | 3 | 4 | 5 | 6 | 7 | 8 | 9 | 10 | 11 | 12 |
|---|---|---|---|---|---|---|---|---|---|---|---|---|
| 1 | GDS | RAM | CBT | GBSR | EBT | EBSR | RBT | RBSR | NBT | NBSR | OAT | OASR |
| 2 | ST | STAG | | | | | | DRN | CFNR | | | |
| 3 | SSW | CWT | SA | CT | RTS | | | | | | | |
| 4 | SE | SN | | | AASEL | | | | | | | |
| 5 | NCL | C1S | C2S | C3S | C4S | C5S | C6S | C7S | C8S | .... | .... | |
| 6 | NSL | S1S | S2S | S3S | .... | ... | ... | ... | ... | ... | ... | |
| 7 | LSLCP | CFN | | | | | | | | | | |

Figure 4

| CIP | 1 | 2 | 3 | 4 | 5 | 6 | 7 | 8 | 9 | 10 | 11 | 12 |
|---|---|---|---|---|---|---|---|---|---|---|---|---|
| 1 | GDS | RAM | CBT | GBSR | EBT | EBSR | RBT | RBSR | NBT | NBSR | OAT | OASR |
| 2 | ST | STAG | | | | | | DRN | CFNR | | | |
| 3 | SSW | CWT | SA | CT | RTS | | | | | | | |
| 4 | SE | SN | | | AASEL | | | | | | | |
| 5 | | | | C3S | C4S | C5S | C6S | C7S | C8S | .... | .... | |
| 6 | | | | S3S | .... | ... | ... | ... | ... | ... | ... | |
| 7 | LSLCP | CFN | | | | | | | | | | |

Figure 5

| CIP | 1 | 2 | 3 | 4 | 5 | 6 | 7 | 8 | 9 | 10 | 11 | 12 |
|---|---|---|---|---|---|---|---|---|---|---|---|---|
| 8 | PI | PGI | TII | TDI | DGI | MRI | RI | BI | PF | | HDF | |
| 9 | SI | TSPI | RTI | HLI | LLI | RRI | CAI | | SF | | LDF | |
| 10 | VI | T1mI | TLI | T1mI | T3II | T2mI | T2II | | VF | | DBF | |
| 11 | CLS | TAG | | | | | | PBR | | RHI | SLI | DPFI |
| 12 | ASW | A1LI | A2LI | A3LI | A4LI | A1TW | A2TW | A3TW | A4TW | ECLS | | |

| CIP | 1 | 2 | 3 | 4 | 5 | 6 | 7 | 8 | 9 | 10 | 11 | 12 |
|---|---|---|---|---|---|---|---|---|---|---|---|---|
| 13 | SSNI | SSNF | | SNSI | SNGI | SNSF | | SNGF | | | SNRI | |
| 14 | SAGmF | SAGF | | SAEPF | | | SNRF | | CRNF | | | |
| 15 | SAGIF | | | | | | | | | | | |
| 16 | CRNI | SRTF | | SSTF | | TACM | | | | | | |
| 17 | SLS | | | | | | | | | | | |
| 18 | ASW | | | | | | | | | | | |

Figure 6

AUTOCONFIGURING GRAPHIC INTERFACE FOR CONTROLLERS HAVING DYNAMIC DATABASE STRUCTURES

CLAIM OF PRIORITY

This application claims priority from U.S. Provisional Application No. 60/140,236 filed Jun. 22, 1999.

FIELD OF THE INVENTION

The present invention relates to process controllers. More specifically, the present invention relates to autoconfiguring graphic interfaces for remotely operable controllers.

BACKGROUND OF THE APPLICATION

Controllers have been used to control industrial processes for many years. A typical controller might maintain a process at a predetermined set point, or control a sequence of events at precisely timed intervals. The control system would have sensors to monitor the process and actuators or control elements to effect necessary changes in the process. Over the years, controllers have evolved to be able to control more complex processes, more precisely. Controllers have been developed which can be reconfigured to control different processes. Thus, the same controller may be reused or reassigned to a new process. Also, controllers have been developed which can be configured and operated remotely.

Many controllers have database elements which store values which reflect the status of a process. These values can be used to display graphic screens representing the process on, for instance, a personal computer. Thus, an operator could view the status of a remote process and even effect changes in the process, through a graphic interface on a remote computer.

One problem, however, is that the interface device needs to know how to interact with the controller in order to properly display and update a graphic interface. Thus, whenever a controller is reconfigured to control a different combination of control loops, any interface devices need to be reprogrammed according to the new configuration to function properly with the controller. In other words, the interface device needs to know what types of control loops a particular controller is controlling, and where in the controller's memory to find the memory elements relevant to each control loop. Whenever a controller was reconfigured, any interface devices with the ability to access the controller needed to be updated as well.

For example, a controller may be configured to control three loops. The first loop may control the temperature of a boiler. The second loop may control the flow of water through a valve, and the third loop may control the timing of a sequence of actions in a machine. Certain information is associated with each loop, and is unique for the type of loop. That information is stored in the controller's memory, and may be accessed by remote devices in order to determine the status of the process, or change the process. For instance, for the boiler loop, the controller would store variables representing the current temperature, the temperature set point, the power presently being delivered to the heating element, etc. For the flow control loop, the controller would store variables representing the valve position, the actual flow rate of water, the flow rate set point, etc.

In order for an interface device to present a graphic interface representing the three configured control loops, the interface device needs to communicate with the controller, and know the location within the controller's memory where information associated with each loop is stored. With prior art controllers, the interface device would have to be programmed to access the controller in its present configuration. Once the controller is reconfigured to control a different combination of control loops, any interface devices which access the controller also need to be reprogrammed to reflect the new configuration. Otherwise, the interface devices would not know where in the controller's memory to locate the information associated with the new combination of control loops.

This situation becomes troublesome when an interface device can access many controllers, and a particular controller may be accessed by many interface devices. The cost and time associated with programming each computer to access each controller grows exponentially with the size of the network. Furthermore, each time a controller's configuration is changed, each interface device which can access the controller would need to be reprogrammed according to the controller's new configuration. Manually programming the interface device to match the configuration of a particular controller can be timely, and introduces the possibility of human error. In addition, with controllers which are accessible via the Internet, the class of interface devices which may access the controller becomes very large, potentially including any device capable of accessing the Internet. Thus, there is a need for a controller which alleviates the burden of programming interface devices to interact with a particular controller's particular configuration. Such a controller would allow any compatible interface device to access any controller with any configuration, and program itself to interact with the controller dynamically.

The present invention solves the above problem by providing a controller which allows interface devices to autoconfigure a graphic interface. Thus, any interface device which can access a controller according to the present invention will be able to automatically update itself to produce graphic interfaces representing the number and types of control loops configured in the controller, and to access the appropriate memory elements within the controller to update the graphic interface to reflect the status of the process.

SUMMARY OF THE INVENTION

A controller is provided which allows an interface device to autoconfigure a graphic interface to reflect the configuration of the controller. The controller has a static memory and a dynamic memory. The static memory contains predefined memory elements which contain information on the number of control loops being controlled, the type of each control loop, and the location within the dynamic memory of a data grouping associated with each control loop. An interface device accesses the static memory to obtain the information necessary to display a graphic interface representative of the controller configuration, and to access appropriate data groups within the dynamic memory to update the graphic interface to reflect the status of the process.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 3 is a table representing memory locations in a prior art controller storing a data grouping associated with a control loop.

FIG. 4 is a table representing the memory locations in the static memory of a controller according to the present invention.

FIG. 5 is a table showing the actual values of certain memory locations of the static memory.

FIG. 6 is a table representing the memory locations in the dynamic memory of a controller according to the present invention.

DETAILED DESCRIPTION OF THE INVENTION

Figure 1:
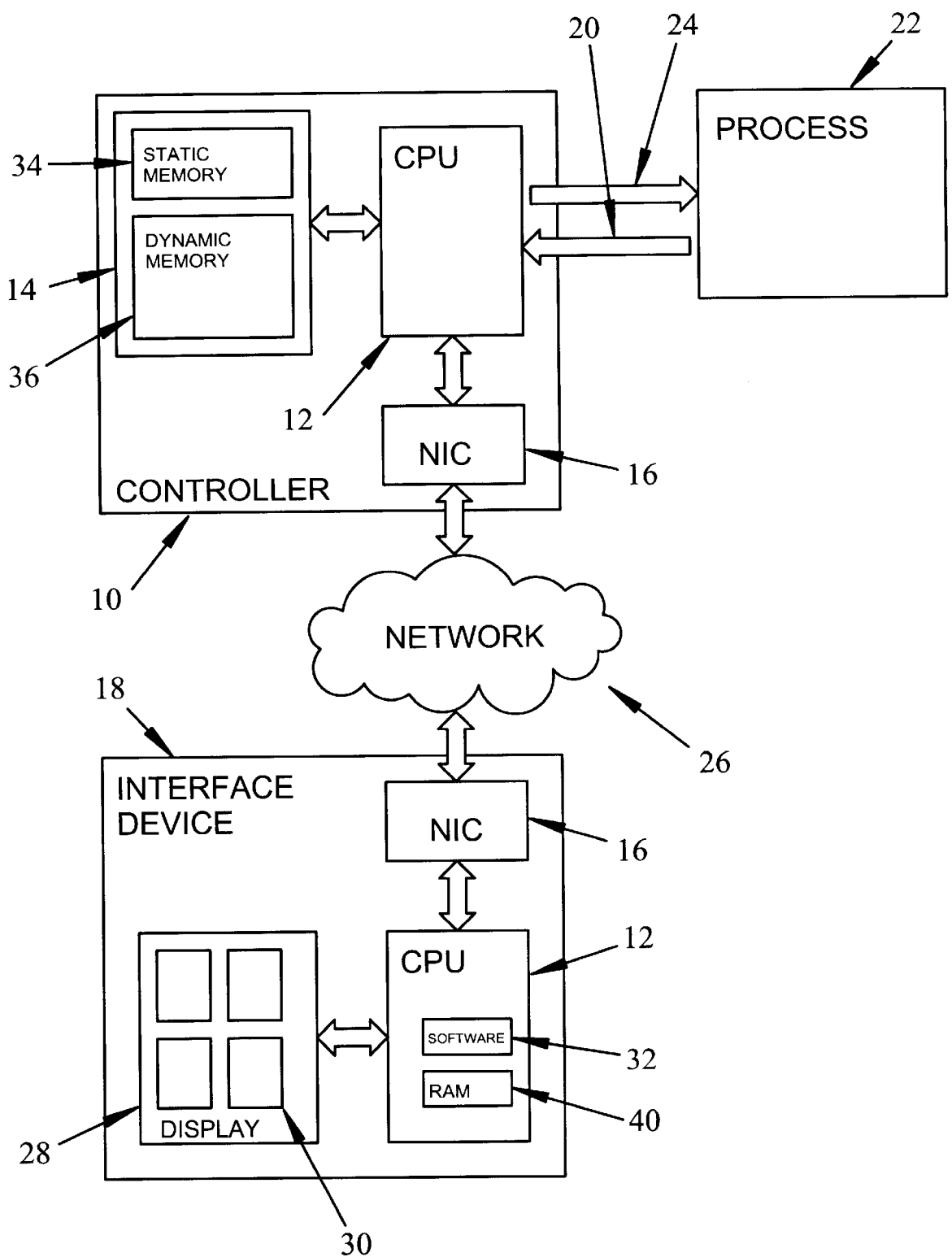
FIG. 1 is a block diagram of the present invention.

FIG. 1 shows a control system according to the present invention. The system comprises a controller 10 which has a CPU 12, a memory 14, and a network communication device 16 for communicating with an interface device 18. The controller 10 receives sensor data 20 from the process being controlled 22, and sends control signals 24 to the process 22. The controller 10 communicates with an interface device 18 through any network 26. Network communication is well known, and the particular protocol used between devices is not important to the invention. The network 26 may be a simple cable, a local area network (LAN), or even the Internet at large. The interface device 18 also has a CPU 12 and a network communication device 16. The interface device 18 further has a display 28 for displaying graphic interface objects 30.

The interface device 18 also has software 32 for displaying a graphic interface 30 on the display 28. The software 32 contains all of the information and instructions necessary to display different types of graphic interface objects associated with different types of control loops. For example, one type of graphic interface would be associated with a control loop that maintains the temperature of a process at a constant value determined by a user defined set point. Another type of graphic interface would be associated with a control loop that controls a sequence of events. The number of different types of graphic interface objects, and thus the variety of control loops, capable of being displayed by the software is not limited. However, each type of graphic interface to be used at the interface device must be preprogrammed into the software 32 before autoconfiguration can occur. In other words, the interface device 18 must be able to recognize the types of control loops, and further have the information necessary to produce graphic interface objects to be associated with the control loops. Once the basic layout of the graphic interface object can be generated by the software, the actual values of variables in the graphic interface object are supplied by the controller's memory.

Figure 2:
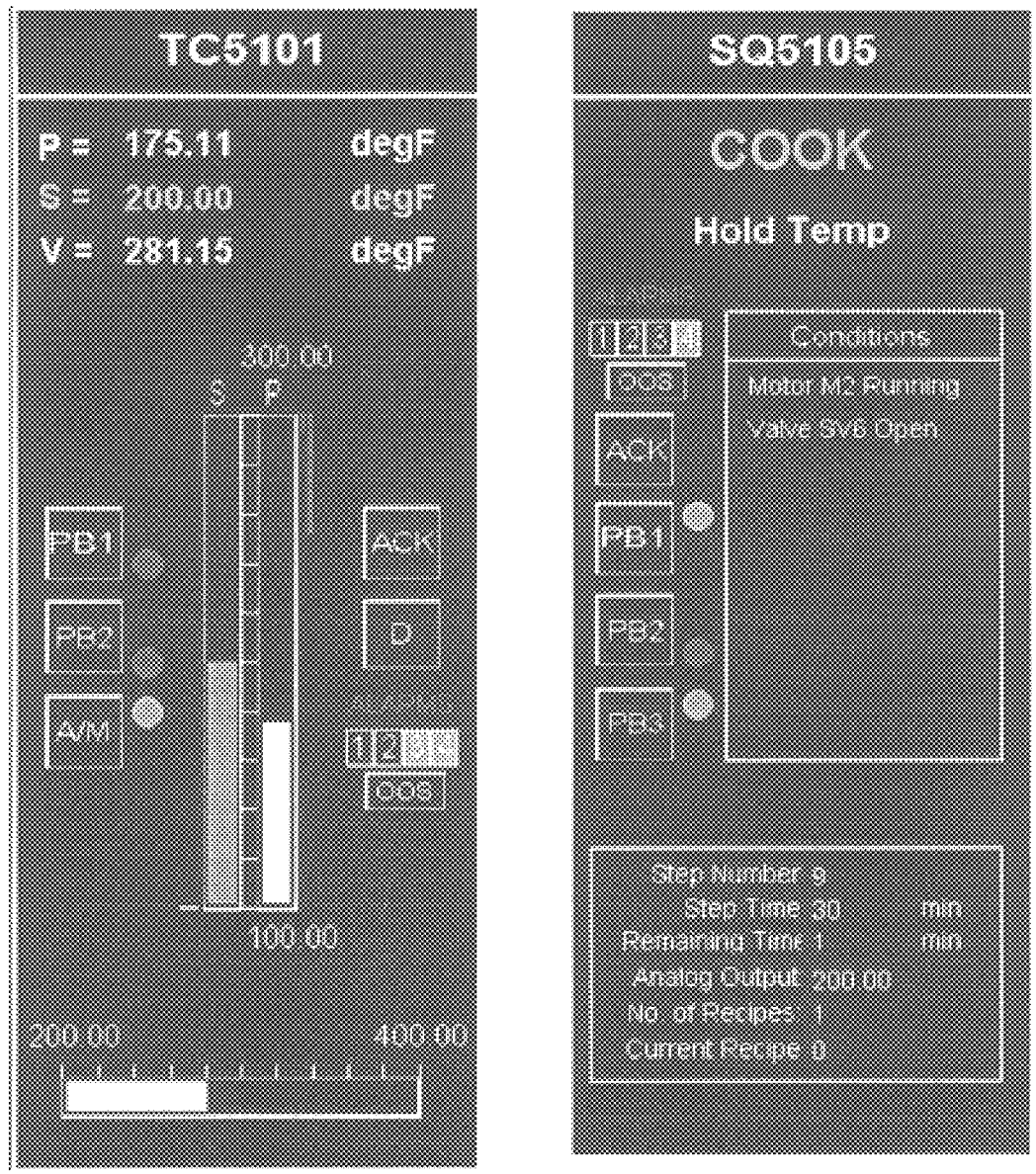
FIG. 2 is an example of graphic interface objects for a control loop and a sequencer loop.

FIG. 2 shows an example of two graphic interface objects. In this example, one graphic interface object is a representation of a face plate for a controlled process which maintains the temperature of a process, while the second graphic interface object represents the faceplate of a sequencer loop. The control loop graphic interface object has one vertical bar which represents the set point of the process, and another vertical bar which represents the current value of the process. This graphic interface object also represents alarms and the status of various other variables. The items in the graphical interface object are populated with data stored in the controller memory 14. In order for the graphic interface object to function properly, it must be able to access the appropriate locations within the controller memory and associate the values stored therein with the appropriate items in the graphic interface. However, the number and type of graphic interface objects required differ depending on how the particular controller is configured.

In order for the interface device to determine the current configuration of the controller, and thus the locations within the controller's memory to find live data with which to populate the graphic interface objects to be generated, the controller memory 14 is divided into a static memory 34 and a dynamic memory 36. The static memory is considered "static" because predefined types of information are stored in predefined locations. The static memory holds information about the current configuration of the controller 10, such as the number of control loops configured, the type of each control loop, and the location within the dynamic memory where updated information relevant to each control loop is stored. In this way, an interface device 18 is able to query the static memory 34 of any controller and obtain information about the controller's current configuration. Thus, interface devices according to the present invention can look to these predefined memory locations in any controller to find the information necessary to work with the controller in its current configuration.

By way of illustration, and not limitation, the following example should serve to clarify the operation of a control system according to the present invention. FIG. 3 shows a table representing memory locations in a prior art controller associated with a particular control loop. Each location holds a particular variable which is relevant to the control loop. For instance, the memory element at column 1, row 1 holds the variable PI, which is the current level of the process. The remaining locations store other variables which are relevant to the loop. This set of data is referred to as a data grouping. If the controller controls multiple control loops, there would be additional data groupings in the controller memory for each additional control loop.

An interface device providing a graphic interface to a controller would be need to be configured to work with the particular controller. In other words, the interface device would need to know the memory location for each data grouping associated with the various control loops stored in the controller memory, in order to populate the corresponding graphic interface object. For example, the variable PI could hold the value of the actual process level of a process control loop. PI would be used by the interface device to determine the height of the vertical bar which represents process level on the corresponding graphic interface object. In this example, PI happens to be stored in column 1, row 1. Thus, the interface device needs to access the memory location at column 1, row 1 to determine how high to make the vertical bar representing actual process level in the graphic interface. In a prior art controller, if the controller is reconfigured to control a different combination of control loops (requiring a different combination of graphic interface objects), the corresponding data groupings would be stored in different memory locations in the controller memory. Thus, the interface device would need to be reconfigured as well.

In a control system according to the present invention, the controller has a static memory. The static memory contains all of the information necessary for an interface device to autoconfigure itself to work with the controller. This information will include the number of control loops, the type of each control loop, and the location within the controller's dynamic memory of the data groupings associated with each control loop. Because the static memory always holds the same type of information in the same locations, any device designed to work with the controller can autoconfigure itself to provide graphic interface objects corresponding to the configured control loops, and access the appropriate data groupings in the controller's dynamic memory to populate the graphic interface objects.

FIG. 4 shows a table representing the static memory of a controller according to the present invention. This portion of memory always contains the same variables in the same locations. The variables provide information to an interface device on the number of control loops configured, the type of each control loop, and the location within the dynamic memory where the data grouping associated with each control loop can be found. In this particular example, the memory location at column 1, row 5 holds the number of control type loops (NCL) configured. The memory location at column 1, row 6 holds the number of sequencer loops (NSL) configured. The memory locations in the columns to the right of NCL and NSL hold either a zero or a value which is the location of the data grouping associated with that particular loop in the dynamic memory.

For example, if the controller was configured to control two loops, the first being a control loop and the second being a sequencer loop, the static memory might appear as represented by the table in FIG. 5. NCL equals 1 because there is one control loop configured. Likewise, NSL equals 1 because there is one sequencer loop configured. To the right of column 1, rows 5 and 6 contain the variables which hold information on the configured control loops. In this example, each control loop is either a control or a sequencer loop. Control loops are indicated by a non-zero value in one of the memory locations labeled C1S, C2S, C3S, etc. (FIG. 4, row 5). Sequencer loops are indicated by a non-zero value in one of the memory locations labeled S1S, S2S, S3S, etc. (FIG. 4, row 6). Thus, in this example, C1S would hold the value of the location in the controller's dynamic memory which contains the starting point of the data grouping associated with the first control loop. S1S would hold zero, confirming that the first loop is not a sequencer loop. C2S would hold zero because the second loop is not a control loop. S2S would hold the value of the location within the dynamic memory which is the starting point of the data grouping associated with the sequencer loop. If there were more control loops configured, the data grouping starting locations of the additional loops would be stored in the appropriate locations in row 5 or 6 of static memory in the additional columns to the right of column 3.

The interface device 18 would communicate with the controller 10 through each device's network interface 16. The interface device 18 would query the controller for the value of the static memory location at column 1, row 5 (the location of "NCL"). The controller would respond with "1" which would let the interface device know that a single control loop is configured. The interface device would then query the static memory location at column 1, row 6 (the location of "NSL"). The controller would respond with "1," letting the interface device know that a single sequencer loop is configured.

Next, the interface device would query static memory locations C1S (column 2, row 5) and S1S (column 2, row 6). The controller would respond with "8" for C1S and "0" for S1S. This tells the interface device that the first configured loop is a control loop and the data grouping associated with the control loop begins at dynamic memory location "8." Because the interface device now knows what type of information is stored beginning at dynamic memory location "8," the interface device can calculate where within the data grouping to find each piece of information. For instance, the actual current value of the process, PI, is stored at the first memory location within the data grouping for this type of control loop. The set point, SI, is stored in the second row, first column of the data grouping.

Next, the interface device would query the static memory at locations C2S (column 3, row 5) and S2S (column 3, row 6). The controller responds with "0" for C2S and "13" for S2S, informing the interface device that the second loop is a sequencer loop, and that the data grouping associated with this sequencer loop is stored in the dynamic memory beginning at memory location "13." Thus, the interface device can locate the information stored in the controller's dynamic memory which is associated with the sequencer loop.

FIG. 6 shows a portion of the dynamic memory of a controller in accordance with the present invention. This portion of the memory is divided into two data groupings corresponding to the control loop and the sequencer loop configured in the controller. The control loop data grouping starts at row 8 and the sequencer loop data grouping starts at row 13. These starting row numbers correspond to the values stored in the static memory (FIG. 5, row 5, column 2 and row 6, column 3).

Each data grouping contains data relevant to the particular type of control loop. For example, row 8, column 1 holds the value of PI, which represents the level of the process. The graphic interface can access PI to determine how long to make the vertical bar representing the process level. Similarly, row 9, column 1 holds SI, which is the current set point. The graphic interface can access SI to update the set point vertical bar.

The data grouping beginning at row 13 contains data relevant to a sequencer loop. The graphic interface can access the variables in this data grouping to interact with the sequencer loop.

Thus, a controller is provided which allows interface devices to access and interact with the various control loops, regardless of the type and number of control loops configured. The interface device is able to read the static memory of the controller and determine the number and type of control loops configured, generate a graphic interface for each control loop, and access the appropriate memory locations within the controller's dynamic memory to update the graphic interface to reflect the current status of the process.

Figure 7:
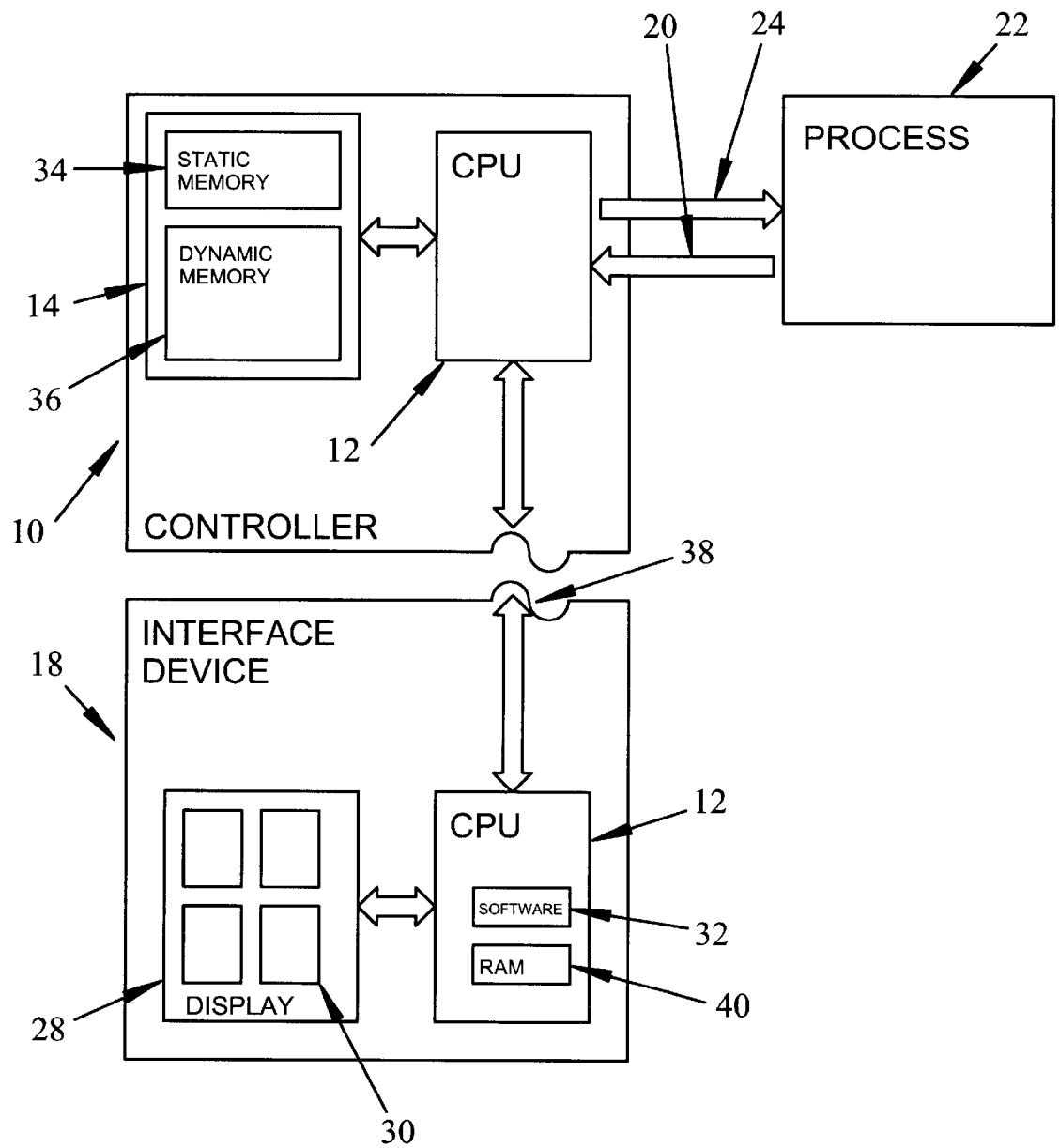
FIG. 7 is a block diagram of a second embodiment of the invention.

FIG. 7 shows and alternate embodiment of the invention. It is not necessary that the interface device be remote from the controller. It is anticipated that an interface device maybe fixed directly to a controller or be portable such that the interface device could be taken to different controllers and connected by means of a simple connector 38. When used in a portable manner, the same interface device could be taken to different controllers with different configurations. The interface would communicate with the controller through the connector 38, and autoconfigure the graphic interface display as described above.

Figure 8:
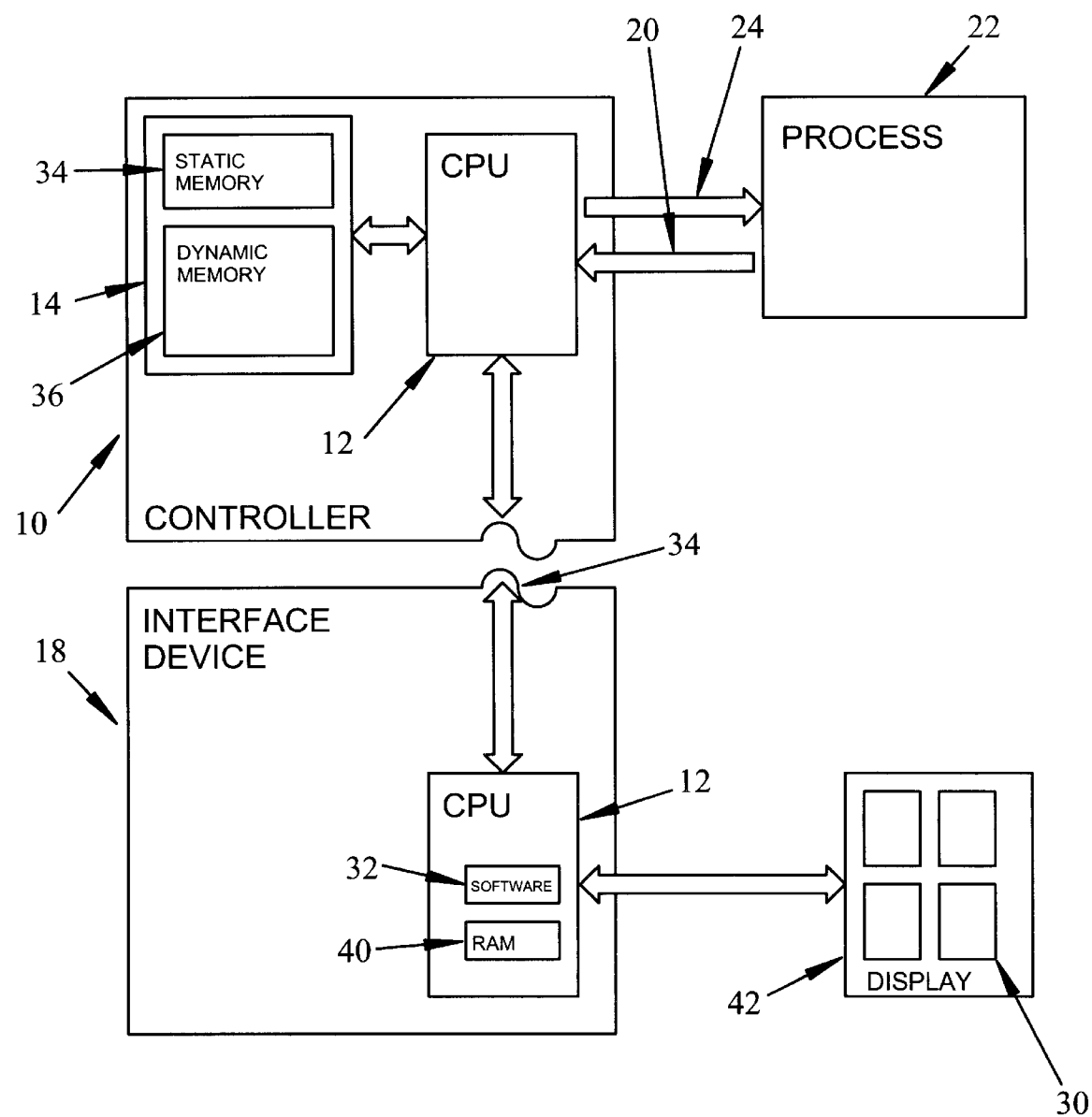
FIG. 8 is a block diagram of a third embodiment of the invention.

Furthermore, it is anticipated that the display device may be remote from the interface device, as shown in FIG. 8. The interface device 18 would store interface objects in the interface memory 40. The interface objects would be accessible via any communication network, including a LAN or the Internet, for use by a remote display 42. The interface objects could be stored as data files, such as HTML documents or Java applets. HTML and Java are well known in the software art.

It should be stressed that the particular methodology or protocol is not important. The invention requires only that a static portion of memory be designated which holds information in designated locations sufficient to inform an interface device of the number and type of control loops configured, and the location within dynamic memory of the data grouping associated with each loop.

The present invention may be embodied in other specific forms without departing from the spirit or essential attributes thereof and, accordingly, reference should be made to the appended claims, rather than to the foregoing specification, as indicating the scope of the invention.

I claim:

1. A control system comprising

A controller having a static memory and a dynamic memory, the controller being configurable to control a plurality of control loops of different types, the static memory having memory elements representative of the number of control loops configured, the type of each control loop, and the location within the dynamic memory where memory elements associated with each configured control loop are located;

an interface device programmed to automatically access the controller static memory to determine the number and type of control loops configured and the location in dynamic memory of the memory elements associated with each configured control loop, to access the controller dynamic memory elements associated with each configured control loop, and associate them with graphic interface objects representative of each configured control loop based on information retrieved from the controller static memory; and a display associated with the interface device for displaying the graphic interface object representative of each configured control loop.

2. The control system of claim 1 wherein the interface device updates the graphic interface objects in response to the data contained in the controller dynamic memory elements associated with each control loop.

3. The control system of claim 2 wherein the interface device communicates with the controller over a network.

4. The control system of claim 3 wherein the network uses the TCP/IP protocol.

5. The control system of claim 3 wherein the network is the Internet.

6. The control system of claim 1 wherein the graphic interface objects are stored as HTML files and made accessible via a communication network.

7. The control system of claim 6 wherein the display device retrieves the graphic interface objects via the communication network.

8. A process for autoconfiguring a graphic interface to a controller comprising the steps of:

providing a controller with a static memory and a dynamic memory, storing in the dynamic memory data groupings associated with a plurality of control loops currently configured in the controller, storing in predefined locations in the static memory information sufficient to inform an interface device how to access the data groupings within the dynamic memory, transmitting the information in the static memory to the interface device, based on the information received from the static memory, causing the interface device to display a plurality of graphic interfaces, each graphic interface representative of at least one of the configured control loops, updating the information in the plurality of data groupings in response to the status of the associated control loop, periodically transmitting information from the data groupings to the interface device, and updating the plurality of graphic interfaces based on the information received from the plurality of data groupings.

9. The process of claim 8 wherein the information is transmitted over a network.

10. The process of claim 9 wherein the network uses the TCP/IP protocol.

11. The process of claim 9 wherein the network is the Internet.

12. A process for autoconfiguring a graphic interface to a controller comprising the steps of:

providing a controller with a static memory and a dynamic memory, storing in the dynamic memory data groupings associated with a plurality of control loops currently configured in the controller, storing in predefined locations in the static memory information sufficient to inform an interface device how to access the data groupings within the dynamic memory, transmitting the information in the static memory to the interface device, based on the information received from the static memory, storing a plurality of interface objects representative of the configured control loops in an interface memory within the interface device, causing a remote display device to retrieve the interface objects over a communication network, and based on the interface objects to display a plurality of graphic interfaces, updating the information in the plurality of data groupings in response to the status of the associated control loop, periodically transmitting information from the data groupings to the interface device, and updating the plurality of graphic interfaces based on the information received from the plurality of data groupings.

13. The process of claim 12 wherein the information is transmitted over a network.

14. The process of claim 13 wherein the network uses the TCP/IP protocol.

15. The process of claim 13 wherein the network is the Internet.

16. The process of claim 12 wherein the remote display device uses the TCP/IP protocol to retrieve the interface objects.

17. The process of claim 16 wherein the remote display device retrieves the interface objects over the Internet.

* * * * *